US008218123B2

United States Patent
Hwang et al.

(10) Patent No.: US 8,218,123 B2
(45) Date of Patent: Jul. 10, 2012

(54) POLARIZATION CONVERTING SYSTEM, METHOD OF MANUFACTURING THE SAME AND LIQUID CRYSTAL DISPLAY USING THE SAME

(75) Inventors: Seong-mo Hwang, Seongnam-si (KR); Seung-ho Nam, Seongnam-si (KR); Moon-gyu Lee, Suwon-si (KR); Young-chan Kim, Suwon-si (KR); Dong-ho Wee, Gunpo-si (KR); Kyung-yeup Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 12/861,058

(22) Filed: Aug. 23, 2010

(65) Prior Publication Data
US 2010/0316812 A1    Dec. 16, 2010

Related U.S. Application Data

(62) Division of application No. 11/507,518, filed on Aug. 22, 2006.

(30) Foreign Application Priority Data

Aug. 24, 2005   (KR) ................. 10-2005-0078035

(51) Int. Cl.
G02F 1/13       (2006.01)
G02F 1/1335     (2006.01)
G02B 5/30       (2006.01)
G02B 27/28      (2006.01)

(52) U.S. Cl. ..... 349/187; 349/96; 349/194; 359/489.01; 359/489.08

(58) Field of Classification Search .................. 349/96, 349/187, 194; 359/495, 489.01, 489.08
See application file for complete search history.

(56) References Cited

U.S. PATENT DOCUMENTS
6,404,550 B1    6/2002   Yajima
2005/0247958 A1 11/2005  Wang et al.

*Primary Examiner* — Michael H Caley
(74) *Attorney, Agent, or Firm* — Sughrue Mion, PLLC (57) ABSTRACT

A polarization converting system and a method of manufacturing the same are provided. The polarization converting system includes a polarization splitting unit splitting incident unpolarized light into two orthogonal polarizations and a polarization converting unit converting incident light into specific polarized light. The polarization converting unit has first and second regions that correspond to the polarization splitting unit and are different in a polarization converting extent from each other.

8 Claims, 7 Drawing Sheets

POLARIZATION CONVERTING SYSTEM, METHOD OF MANUFACTURING THE SAME AND LIQUID CRYSTAL DISPLAY USING THE SAME

CROSS-REFERENCE TO RELATED PATENT APPLICATIONS

This is a Divisional of U.S. application Ser. No. 11/507,518 filed Aug. 22, 2006, which claims priority from Korean Patent Application No. 10-2005-0078035, filed on Aug. 24, 2005, in the Korean Intellectual Property Office. The entire disclosures of the prior applications are considered part of the disclosure of the accompanying Divisional Application and are hereby incorporated by reference in their entirety.

BACKGROUND OF THE INVENTION

1. Field of the Invention

The present invention relates to a polarization converting system, a method of manufacturing the same and a liquid crystal display using the same, and more particularly, to a polarization converting system that can reduce a light loss caused by a misalignment of a polarization splitting unit and a polarization converting unit, a method of manufacturing the polarization converting system and a liquid crystal display using the polarization converting system.

2. Description of the Related Art

In a current liquid crystal display (LCD), only about 5% of total light flux emitted from a light source is used as effective light. Absorption of light by both color filters and absorbing polarizers is the number one cause of the deterioration of the light efficiency.

In an LCD panel, as absorbing polarizers disposed on both sides of a liquid crystal layer basically absorb 50% of incident unpolarized light, studies for improving the light efficiency by replacing the polarizing plates or converting most of the light incident on the polarizing plates into polarized light in parallel with transmission axes of the polarizing plates have been actively done.

One of the studies is to split incident unpolarized beam into two rays of linearly polarized light using a hologram device or a polarizing beam splitter (PBS) and rotate one linearly polarized light by 90 degrees by selectively providing a half wave plate on the one linearly polarized light path, thereby converting all of the light incident on the LCD panel into specific linearly polarized light. As a result, by eliminating the light absorption by the absorbing polarizers, the light efficiency can be improved. As described above, a system including the PBS and half wave plate for converting the polarization of the all of the light into the specific polarization is called a polarization converting system.

Figure 1:
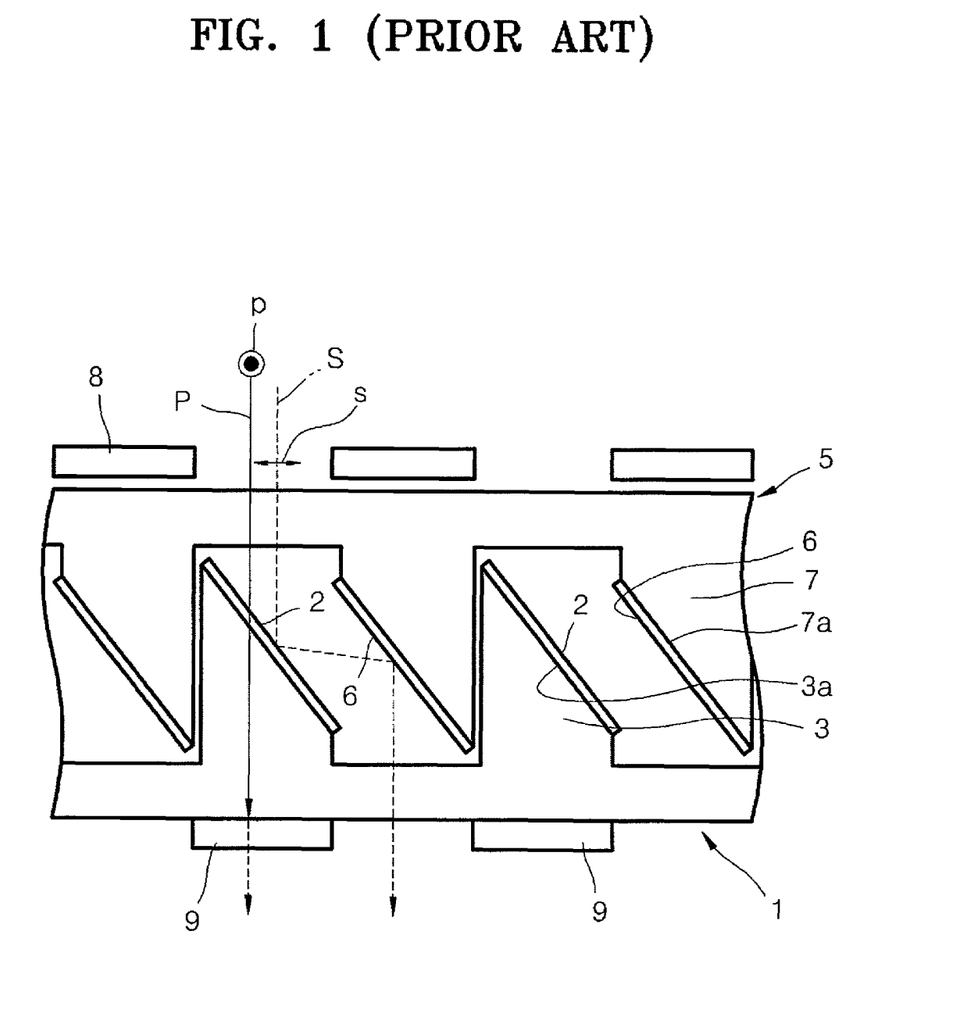
FIG. 1 is a schematic view of a polarization converting system disclosed in Japanese Laid-Open Pat. No. 2004-272106.

FIG. 1 schematically illustrates a polarization converting system disclosed in Japanese Laid-Open Patent No. 2004-272106.

Referring to FIG. 1, the polarization converting system includes first and second light transmission members 1 and 5 respectively having inclined portions 3 and 7 of which sections are formed in a triangular shape and of which inclined surfaces 3A and 7a are spaced apart from each other by a predetermined gap to be aligned in an identical direction, first and second polarization splitting films 2 and 6 respectively formed on the inclined surfaces 3A and 7a, half wave plates 9 formed on a first surface of the first light transmission member 1 to correspond to the inclined portions 3 formed on a second surface opposite to the first surface, and light shielding members 8 formed on a first surface of the second light transmission member 5 to correspond to the inclined portions 7 formed on a second surface opposite to the first surface.

In the related art polarization converting system, unpolarized light incident on regions between the light shielding members 8 is split by the first polarization splitting films 2 formed on the inclined portions 3 of the first light transmission member 1. P-polarized light passes through the first polarization splitting films 2 and is converted into S-polarized light by the half wave plates 9. The S-polarized light is reflected from the first polarization splitting films 2 to the second polarization light splitting layers 6 formed on the inclined portions 7 of the second light transmission member 5 and is further reflected on the second polarization splitting films 6 to travel in a direction identical to that of the P-polarized light passed through the first polarization splitting films 2.

When the above-described related art polarization converting system is used, unpolarized light can be converted into specific linearly polarized light.

However, in the related art polarization converting system, since the half wave plates 9 must be installed to correspond to the first polarization splitting films 2 provided on the inclined portions 3 of the first light transmission member 1 through a special process, there may be a misalignment between the half wave plates 9 and the first polarization splitting films 2. The misalignment may cause the deterioration of the polarization converting efficiency. For example, when the half wave plates 9 are deviated from optimum locations relative to the corresponding first polarization splitting films 2, a part of the P-polarized light passed through the first polarization splitting films 2 does not passed through the corresponding half wave plates 9 but travels as it is and a part of the S-polarized light reflected from the first and second polarization splitting films 2 and 6 passes through the corresponding half wave plates 9 to be converted into the P-polarized light. As a result, the light emitted from the related art polarization converting system may partly include undesired P-polarized light, thereby deteriorating the polarization converting efficiency.

Furthermore, in order to prevent the misalignment between the first polarization splitting films 2 and the corresponding half wave plates 9 when manufacturing the related art polarization converting system, a precise aligning process is required, thereby increasing the manufacturing costs.

SUMMARY OF THE INVENTION

The present invention provides a polarization converting system that can reduce a light loss, which has caused by a misalignment between a polarization splitter and a polarization converter, by automatically aligning the polarization splitter and the polarization converter through a single process and dramatically improve the polarization converting efficiency as well as the light efficiency through a simple manufacturing process. The present invention further provides a method of manufacturing such a polarization converting system and a liquid crystal display using such a polarization converting system.

According to an aspect of the present invention, there is provided a polarization converting system including: a polarization splitting unit splitting incident unpolarized light into two orthogonal polarizations; and a polarization converting unit converting incident light into specific polarized light, the polarization converting unit having first and second regions that correspond to the polarization splitting unit and are different in a polarization converting extent from each other.

One of the first and second regions may be a polarization maintaining region maintaining the polarized state of the incident light as it is and the other may be a polarization converting region converting the incident polarized light into polarized light identical to light passing through the polarization maintaining region.

The polarization converting unit may include a liquid crystal layer having first and second regions different in a polarization converting extent from each other, the liquid crystal layer being formed of one of liquid crystals or liquid crystal polymers.

One of the first and second regions of the liquid crystal layer may be a polarization maintaining region maintaining the polarized state of the incident light as it is and the other is a polarization converting region converting the incident polarized light into polarized light identical to light passing through the polarization maintaining region.

The polarization converting unit may further include first and second liquid crystal alignment layers between which the liquid crystal layer is disposed, the polarization converting region of the liquid crystal layer may be formed in a TN (twisted nematic) mode and the polarization maintaining region of the liquid crystal layer may be formed in a HAN (hybrid aligned nematic) mode.

The first liquid crystal alignment layer may include homeotropic and homogeneous alignment regions, the second liquid crystal alignment layer is formed as homogeneous alignment region, the polarization converting region of the liquid crystal layer, which corresponds to the homogeneous alignment region of the first liquid crystal alignment layer, may be the TN mode, and the polarization maintaining region of the liquid crystal layer, which correspond to the homeotropic alignment region of the first liquid crystal alignment layer, may be the HAN mode.

The first and second liquid crystal alignment layers may be formed of photopolymer.

The homogeneous and homeotropic alignment regions of the first liquid crystal alignment layer may be formed by selectively irradiating first polarized ultraviolet light and the homogeneous alignment regions of the second liquid crystal alignment layer may be formed by irradiating second polarized ultraviolet light orthogonal to the first polarized light.

The first and second polarized ultraviolet light may be linearly polarized ultraviolet light orthogonal to each other.

The first and second regions may be alternately formed on the polarization converting unit.

According to a feature of the present invention, the polarization splitting unit may include: a polarization splitting portion splitting the unpolarized light incident on a location corresponding to one of the first and second regions into two orthogonal polarizations; and a light path changing portion allowing two lights having orthogonal polarization each other, which are split at the polarization splitting portion, to travel in an identical direction.

The polarization splitting portion may include a first polarization splitter splitting the incident unpolarized light by selectively transmitting and reflecting the incident unpolarized light according to the polarization and the light path changing portion includes a first reflector allowing the polarized light reflected from the first polarization splitter to travel in a direction identical to other orthogonal polarized light, which transmits the first polarization splitter, wherein the first splitter and the first reflector are alternately arranged to correspond to an arrangement of the first and second regions of the polarization converting unit and the first reflector is one of the reflective mirrors and the polarization splitters functioning to reflect the polarized light reflected from the first polarization splitter.

The polarization converting system may further include one of a reflective mirror and a light shielding member, which is provided on a location corresponding to the first reflector disposed on a unpolarized light incident side of the polarization unit to allow the unpolarized light to be incident only on the first polarization splitter.

Alternatively, the polarization converting system may further include an array of micro lenses that are provided on a unpolarized light incident side of the polarization unit to correspond to a pair of the first polarization splitter and the first reflector that are adjacent to each other, the micro lens array increasing the intensity of light incident on the first polarization splitter by collecting the incident unpolarized light.

The polarization splitting unit may include a plate having a first surface provided with a plurality of first and second inclined portions that are alternately arranged and the first polarization splitter and the first reflector are respectively provided on the first and second inclined portions.

According to another feature of the present invention, the polarization splitting unit may include a plurality of first splitting members, which are arranged to correspond to one of the first and second regions and a second splitting member functioning as the light path changing portion, the second splitting member having a first surface provided with a plurality of coupling grooves in which the first splitting members are inserted and coupled and a second surface provided with a plurality of refracting portions, each of which corresponds to the other of the first and second regions, wherein one of each first splitting member and the second splitting member is formed of an anisotropic medium and the other is formed of an isotropic medium, the coupling grooves coupling the first splitting members to the second splitting member are formed such that a boundary surface between each first splitting member and the second splitting member can define an inclined surface, the boundary surface functioning as the polarization splitting portion and the unpolarized light incident on the first splitting members straightly transmitting the boundary surface or being refracted to split according to the polarization at the boundary surface, and the refracting portions are provided to allow the polarized light refracted on the boundary surface to travel in a direction in parallel to light transmitting the boundary surface by refracting the polarized light.

Each of the refracting portions may include one or more refracting grooves adjacent to each other, which are formed on the second surface of the second splitting member to correspond to the other of the first and second regions, each of the refracting grooves defining inclined surface refracting light, which travels after being refracted on the boundary surface.

At least one of the refracting grooves may have a section formed in a triangular shape.

According to another aspect of the present invention, there is provided a method of manufacturing a polarization converting system, including: providing a polarization splitting unit having a polarization splitting portion splitting unpolarized light according to polarization and a light path changing portion allowing splitted two lights having orthogonal polarization each other to travel in an identical direction; disposing a first member, having a first liquid crystal alignment layer formed by depositing photoreactive photopolymer, on the polarization splitting unit; forming two types of liquid crystal alignment regions, different from each other, by irradiating the first polarized ultraviolet light through only one of a region corresponding to the polarization splitting portion and a region corresponding to the light path changing portion of the polarization splitting unit; forming a single liquid crystal alignment region by irradiating second polarized ultraviolet light orthogonal to the first polarized ultraviolet light to a front surface of the second member having a second liquid crystal alignment layer formed by depositing photoreactive photopolymer; and forming a liquid crystal layer formed of one of liquid crystals or liquid crystal polymers by injecting the liquid crystal and selectively an initiator capable of forming the polymer by being bonded with the liquid crystal between the first and second members, the liquid crystal layer having first and second regions that are different in a polarization converting extent from each other and automatically aligned with the polarization splitting and light path changing portions of the polarization splitting unit.

The first and second polarized ultraviolet lights may be linearly polarized ultraviolet light having orthogonal polarization each other.

The first and second regions of the polarization converting unit may be alternately arranged to correspond to an arrangement of the polarization splitting and light path changing portions of the polarization splitting unit, where the polarization splitting and light path changing portions may be alternately arranged.

The polarization splitting unit may be designed to allow the light to be incident only on the polarization splitting portion.

According to still another aspect of the present invention, there is provided a liquid crystal display including: a liquid crystal panel; a backlight system irradiating light to the liquid crystal panel; and a polarization converting system for directing the light irradiated from the backlight system to the liquid crystal panel after converting the light into specific polarized light, the polarization converting system including at least one of the features of the above-described polarization converting system.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 2:
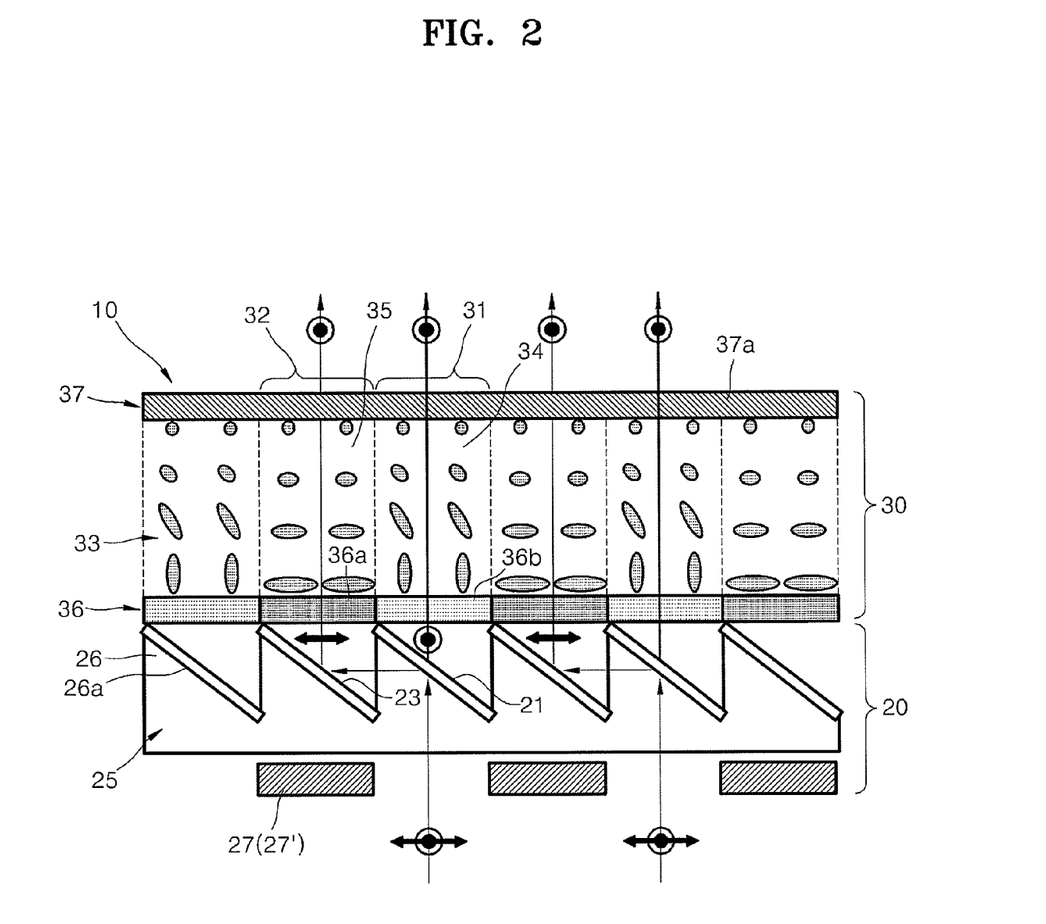
FIG. 2 is a schematic view of a polarization converting system according to an exemplary embodiment of the present invention.

FIG. 2 shows a schematic view of a polarization converting system according to an exemplary embodiment of the present invention.

Referring to FIG. 2, a polarization converting system 10 according to this exemplary embodiment includes a polarization splitting unit 20 splitting incident unpolarized light into two orthogonal polarizations and a polarization converting unit 30, which has first and second regions 31 and 32 different in a polarization converting extent from each other and corresponding to the polarization splitting unit 20, for converting the incident light into specific polarized light. The first and second regions 31 and 32 are alternately formed in the polarization converting unit 30. The polarization splitting unit 20 includes polarization splitting portions splitting the unpolarized light incident on a location corresponding one of the first and second regions 31 and 32 of the polarization converting unit 30 according to the polarization and light path changing portions allowing the incident light to travel toward the other of the first and second regions 31 and 32 at a location corresponding to the other of the first and second regions 31 and 32. The polarization splitting portions and the light path changing portions are alternately arranged to the arrangement of the first and second regions 31 and 32.

In this exemplary embodiment, the polarization splitting portions includes first polarization splitters 21 splitting the incident unpolarized light by transmitting or reflecting the incident unpolarized light according to the polarization. The light path changing portion includes first reflectors 23 reflecting polarized light reflected from the first polarization splitters 21 to allow the polarized light to travel in a direction where orthogonal another polarized light, which is transmitted by the first polarization splitters 21, travels.

The first polarization splitters 21 and the first reflectors 23 are alternately arranged to correspond to the arrangement of the first and second regions 31 and 32 of the polarization converting unit 30.

The first reflector 23 may be formed of a reflective mirror. Alternatively, the first reflector 23 may be formed of a polarization splitter having a function identical to that of the first polarization splitter 21 to reflect the polarized light reflected from the first polarization splitter 21.

As shown in FIG. 2, the polarization splitting unit 20 includes a plate 25 provided at a surface with a plurality of inclined portions 26. The first polarization splitters 21 and the first reflectors 23 are alternately disposed on the inclined surfaces 26a of the inclined portions 26. That is, the first polarization splitters 21 are disposed on first inclined surfaces and the first reflectors 23 are disposed on second inclined surfaces adjacent to the first inclined surfaces. A section of the inclined portion 26 may be formed in a rectangular triangular shape.

On an opposite surface of the plate 25, reflective mirrors 27 may be disposed to correspond to the first reflectors 23 and allow the unpolarized light to be incident on the first polarization splitters 21. Instead of the reflective mirrors 27, light shielding members 27' for blocking out the incident light may be disposed.

In the above-described polarization splitting unit 20, the first polarization splitters 21 and the first reflectors 23 may be formed on the inclined surfaces 26a of the inclined portions 26 through a thin film coating.

In the polarization converting unit 30, one regions among the first and second regions 31 and 32, for example, the first regions 31 corresponding to the first polarization splitters 21 may be polarization maintaining regions maintaining the polarized state of the incident polarized light as it is and the other regions among the first and second regions, for example, the second regions 32 corresponding to the first reflectors 23 may be polarization converting regions converting the incident polarized light into polarized light identical to the light transmitted by the polarization maintaining regions.

For example, as exemplarily illustrated in FIG. 2, the polarization converting unit 30 includes a liquid crystal layer 33 in which the first and second regions 31 and 32, which are different in the polarization converting extent of the incident light from each other, are alternately arranged. In addition, the first and second regions 31 and 32 may be formed to be the polarization maintaining regions 34 and the polarization converting regions 35, respectively.

FIG. 2 shows an example where the first polarization splitters 21 reflect the S-polarized light and transmit the P-polarized light, the polarization maintaining regions 34 are formed to correspond to the first polarization splitters 21, and the polarization converting regions 35 are formed to correspond to the first reflectors 23. However, the present invention is not limited to this example. For example, the first polarization splitters 21 may be designed to transmit the S-polarized light and reflect the P-polarized light. In addition, the polarization maintaining regions 34 may be formed to correspond to the first reflectors 23 and the polarization converting regions 35 may be formed to correspond to the first polarization splitters 21. However, the description will be made with reference to FIG. 2 for the descriptive convenience.

In order to form the liquid crystal layer 33 of a two-domain structure having an array of the pairs of the polarization maintaining and polarization converting regions 34 and 35, the polarization converting unit 30 includes first and second liquid crystal alignment layers 36 and 37 between which the liquid crystal layer 33 of the two-domain structure is disposed.

The polarization converting regions 35 of the liquid crystal layer 33 may be formed in a twisted nematic (TN) mode and the polarization maintaining regions 34 of the liquid crystal layer 33 may be formed in a hybrid aligned nematic (HAN) mode. When linearly polarized light in a direction in parallel with a liquid crystal director is incident, the TN mode functions as a half wave plate that delays a phase by λ/2 by rotating a polarizing direction of the incident light. The HAN mode does not change the polarization state of the incident polarized light.

In order to form the liquid crystal layer 33 such that the polarization converting regions 35 of the TN mode and the polarization maintaining regions 34 of the HAN mode are alternately arranged, homogeneous and homeotropic alignment regions 36a and 36b are alternately arranged on the first liquid crystal alignment layer 36 near the polarization splitting unit 20 and homogeneous alignment regions 37a are formed all over the second liquid alignment layer 37 remote from the polarization splitting unit 20. The homogeneous alignment regions 36a are regions for homogeneously aligning the liquid crystal. The homeotropic alignment regions 36b are regions for homeotropically aligning the liquid crystal.

As described above, after the first and second liquid crystal alignment layers 36 and 37 are formed, liquid crystal, for example, nematic liquid crystal is injected in a space between the first and second liquid crystal alignment layers 36 and 37. Then, some regions of the liquid crystal layer 33, which correspond to the homogeneous alignment regions 36a of the first liquid crystal alignment layer 36, are to be the polarization converting regions 35 where the liquid crystal is aligned in the TN mode, and other regions of the liquid crystal layer 33, which correspond to the homeotropic alignment regions 36b of the first liquid crystal alignment layer 36, are to be the polarization maintaining regions 34 aligned in the HAN mode.

The first and second liquid crystal alignment layers 36 and 37 are formed of photopolymer and formed to have the above-described alignment regions using predetermined polarized ultraviolet light.

That is, when first polarized ultraviolet light, for example, the S-polarized ultraviolet light is selectively irradiated to the first liquid crystal alignment layer 36 formed of the photopolymer through the polarization splitting unit 20, the homogeneous and homeotropic alignment regions 36a and 36b are to be alternately formed. When second polarized ultraviolet light orthogonal to the first polarized ultraviolet light, for example, the P-polarized ultraviolet light is irradiated to the second liquid crystal alignment layer 37 formed of the photopolymer, the homogeneous alignment regions 37a are to be formed in a direction perpendicular to the homogeneous alignment regions 36a of the first liquid crystal alignment layer 36.

In the first liquid crystal alignment layer 36, regions to which the first polarized ultraviolet light is irradiated are to be the homogeneous alignment regions 36a and regions to which the ultraviolet light is not irradiated are to be the homeotropic alignment regions 36b. In addition, when the second polarized ultraviolet light is irradiated to all over the second liquid crystal alignment layer 37, the homogeneous alignment regions 37a aligning liquid crystal in a direction perpendicular to a direction aligned by the homogeneous alignment regions 36a of the first liquid crystal alignment layer 36 are formed on all over the second liquid crystal alignment layer 37.

Figure 3A:
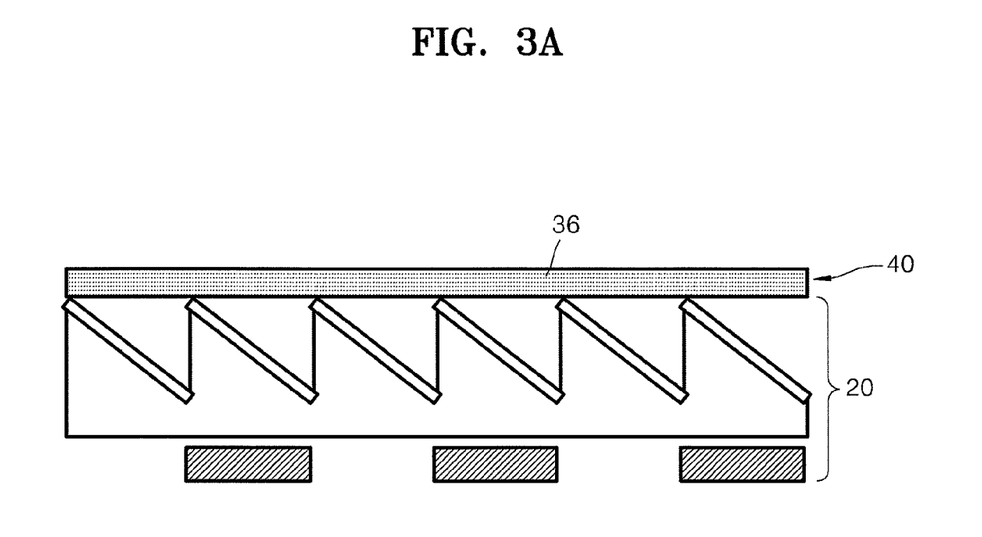
FIGS. 3A through 3C are schematic views illustrating a method of manufacturing a polarization converting system according to an exemplary embodiment of the present invention.
Figure 3B:
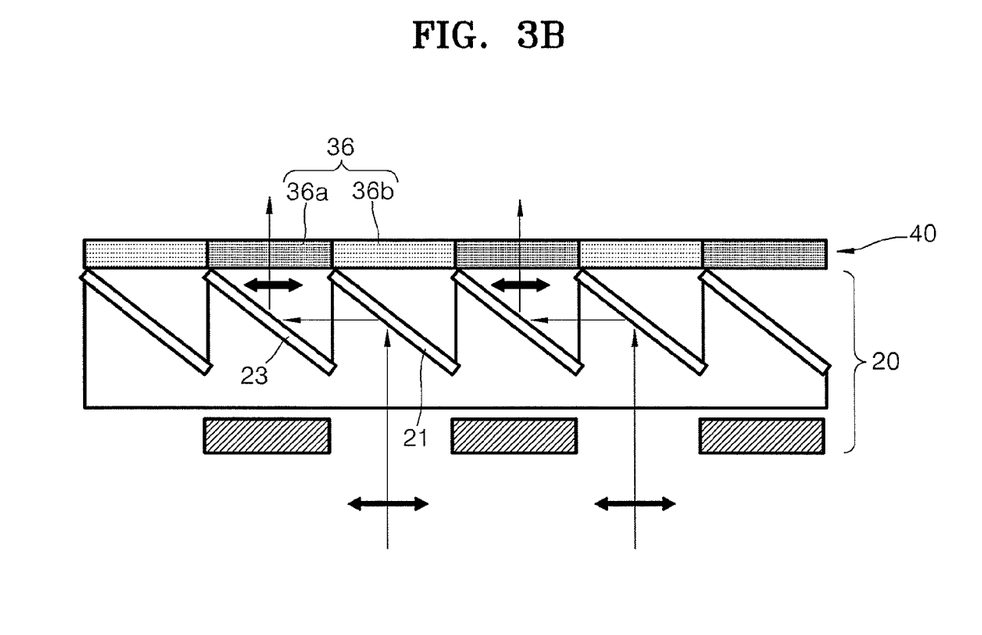
Figure 3C:
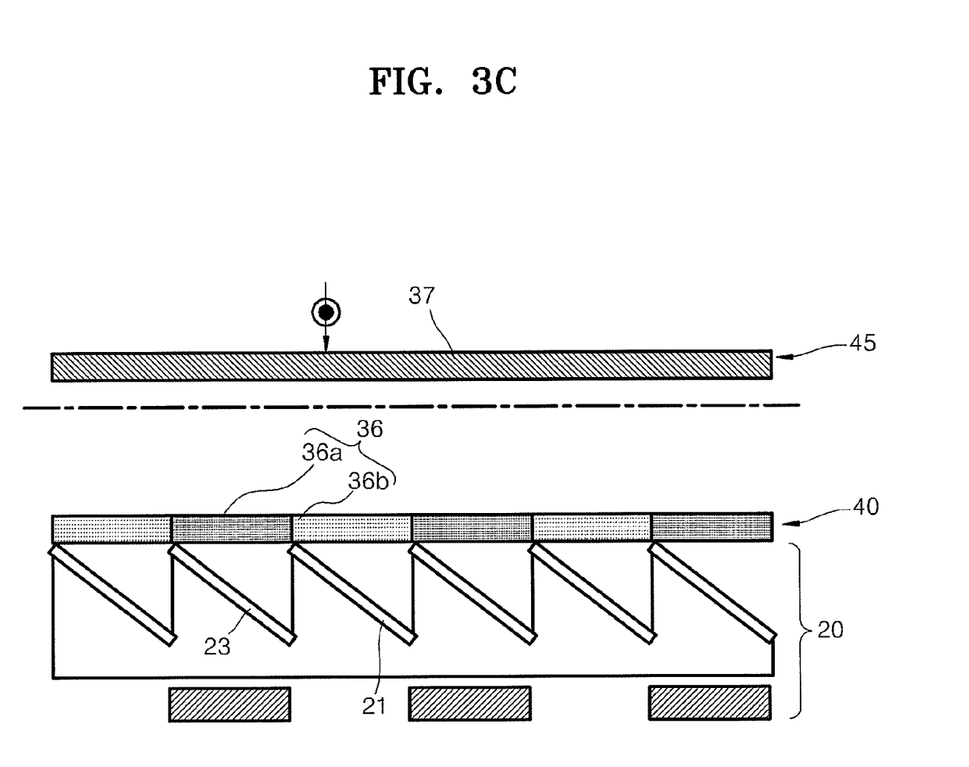

FIGS. 3A through 3C show schematic views illustrating a method of manufacturing a polarization converting system according to an exemplary embodiment of the present invention. Although FIGS. 3A through 3C illustrate an example of a method for manufacturing the polarization converting system of the foregoing exemplary embodiment, this method may be applied to manufacture polarization converting system according to other exemplary embodiments that will be described later.

Referring first to FIG. 3A, the polarization splitting unit 20 is provided and a first member 40 having the first liquid crystal alignment layer 36 formed by depositing photoreactive photopolymer is disposed on the polarization splitting unit 20. That is, the first member 40 includes the first liquid crystal alignment layer 36 and a transparent substrate (not shown) on which the first liquid crystal alignment layer 36 is formed by depositing the photopolymer. The transparent substrate is not illustrated in FIG. 3A for the sake of convenience.

Referring to FIG. 3B, the selective irradiation of the first polarized ultraviolet light to alternately form the homogeneous and homeotropic alignment regions 36a and 36b on the first liquid crystal alignment layer 36 is realized using the first polarization splitters 21 and the first reflectors 23.

For example, as shown in FIG. 3B, the first polarization splitters 21 are provided to reflect the S-polarized light and transmit the P-polarized light. When the first polarized light is the S-polarized light, the incident S-polarized ultraviolet light is reflected from the first polarization splitters 21 to the first reflectors 23. The ultraviolet light is reflected from the first reflectors 23 and irradiated to the first liquid crystal alignment layer 26. Therefore, the S-polarized ultraviolet light is irradiated to regions corresponding to the first reflectors 23 of the first liquid crystal alignment layer 36 to form the homogeneous alignment regions 36a and other regions are not irradiated by the ultraviolet light to remain as the homeotropic alignment regions 36b. As a result, the homeotropic and homogeneous alignment regions 36b and 36a are alternately formed to correspond to the arrangement of the first polarization splitters 21 and the first reflectors 23.

Next, as shown in FIG. 3C, second polarized ultraviolet light orthogonal to the first polarized ultraviolet light, for example, the P-polarized ultraviolet light is irradiated to a front surface of a second member 45 having the second liquid crystal alignment layer 37 formed by depositing the photoreactive photopolymer. In this case, the second liquid crystal alignment layer 37 is in a homogeneous alignment state rotated by 90 degrees from an alignment direction of the homogeneous alignment regions 36a of the first liquid crystal alignment layer 36. Here, the second member 45 includes the second liquid crystal alignment layer and a transparent substrate (not shown) on which the second liquid crystal alignment layer 37 is formed by depositing the photopolymer. The transparent substrate is not illustrated in FIG. 3C for the convenience.

After the first and second liquid crystal alignment layers 36 and 37 are formed as described above, nematic liquid crystal and spacers (not shown) for maintaining a predetermined gap between the first and second liquid crystal alignment layers 36 and 37 are injected between the first and second liquid crystal alignment layers 36 and 37, as illustrated in FIG. 2. Then, the liquid crystal layer 33 having the two-domain structure that is automatically aligned with the first polarization splitters 21 is formed. That is, the liquid crystal layer 33 in which the polarization maintaining regions 34 and the polarization converting regions 35 are alternately arranged to correspond to the homeotropic and homogeneous alignment regions 36b and 36a is formed. At this point, the liquid crystal layer 33 may be formed in a liquid crystal polymer layer through the photopolymerization using liquid crystal having a polymerization functional group and a photoinitiator. That is, the liquid crystal layer 33 may be formed of one of the liquid crystals and the liquid crystal polymers.

The polarization converting regions 35 rotate the polarization of the incident light by 90 degrees and the polarization maintaining regions 34 maintain the polarization of the incident light. As a result, all of the light irradiated from the polarization converting unit 30 has identical linearly polarized light.

Here, the first polarized light may be the P-polarized light and the first polarization splitters 21 may be designed to reflect the S-polarized light and transmit the P-polarized light. In this case, since the P-polarized ultraviolet light is irradiated to the first liquid crystal alignment layer 36 after transmitting the first polarization splitters 21, some regions of the first liquid crystal alignment layer 36, which correspond to the first polarization splitters 21, are to be the homogeneous alignment regions 36a and other regions of the first liquid crystal alignment layer 36 remains as the homeotropic alignment regions 36b. Therefore, the first regions of the liquid crystal layers 33, which correspond to the first polarization splitters 21, are to be the polarization converting regions 35 and the second regions of the liquid crystal layer 33, which correspond to the first reflectors 23, are to be the polarization maintaining regions 34.

According to the above-described exemplary embodiment of the present invention, since the first polarized ultraviolet light is selectively irradiated to the first liquid crystal alignment layer 36 by the polarization splitting unit 20, the first polarization splitters 21 of the polarization splitting unit 20 and the polarization converting regions 35 functioning as the half wave plates are automatically aligned with each other through a series of manufacturing processes, thereby preventing the misalignment problem of the related art polarization converting system.

Figure 4:
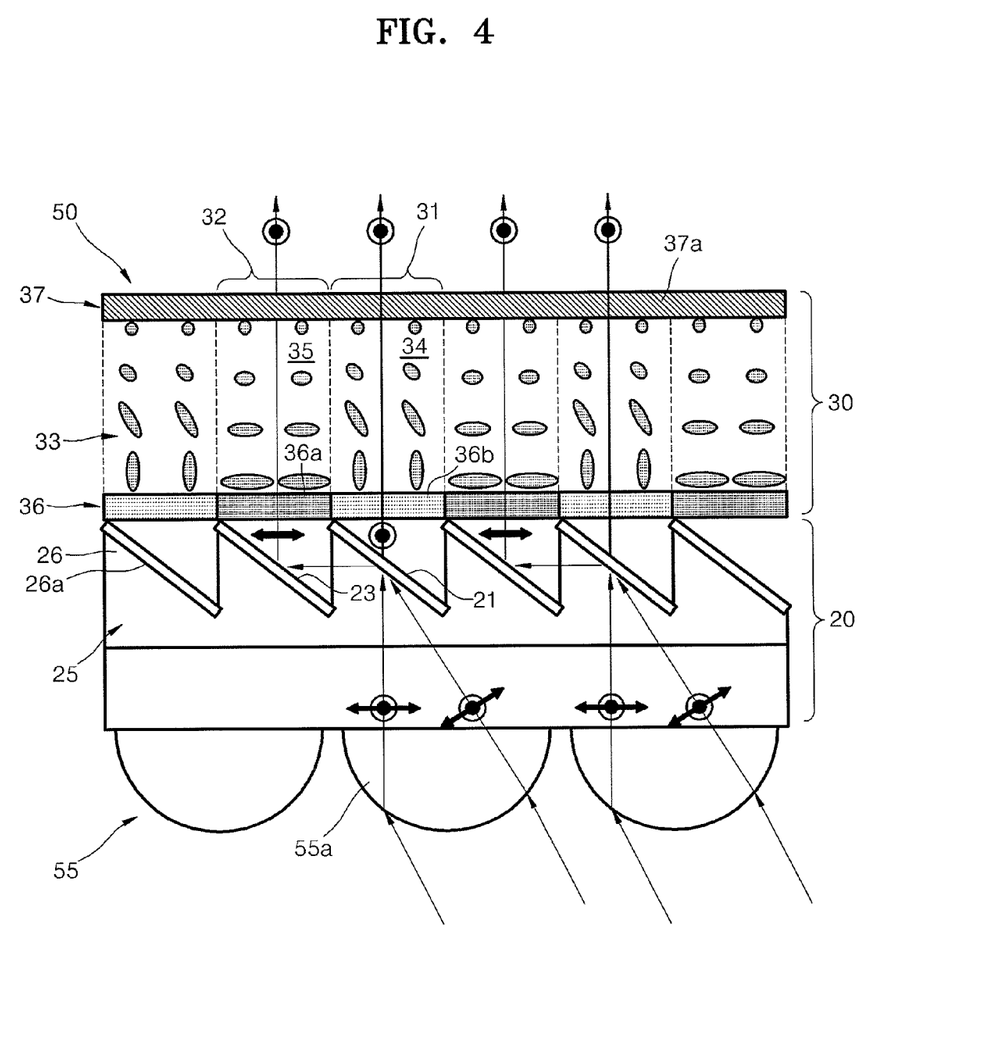
FIG. 4 is a schematic view of a polarization converting system according to another exemplary embodiment of the present invention.

FIG. 4 illustrates a schematic view of a polarization converting system according to another exemplary embodiment of the present invention. According to a feature of this exemplary embodiment, a microlens array 55 is provided instead of the reflective mirrors 27 or the light shielding members 27' that are described in the foregoing exemplary embodiment illustrated with reference to FIG. 2 to allow the unpolarized light to be introduced into only the first polarization splitters 21. The same reference numbers will be used in FIG. 4 to refer to the parts that are same as those in FIG. 2 and the description thereof will be omitted in this.

Referring to FIG. 4, a polarization converting system 50 according to this exemplary embodiment includes the micro lens array 55 that is provided on a light incident surface of a polarization splitting unit 20 to correspond to pairs of a first polarization splitter 21 and a first reflector 23 that are disposed to be adjacent to each other. Each micro lens 55a of the microlens array 55 collects incident unpolarized light and directs the collected light to the first polarization splitters 21. The microlens increases the intensity of the light incident on the first polarization splitters 21.

Figure 5:
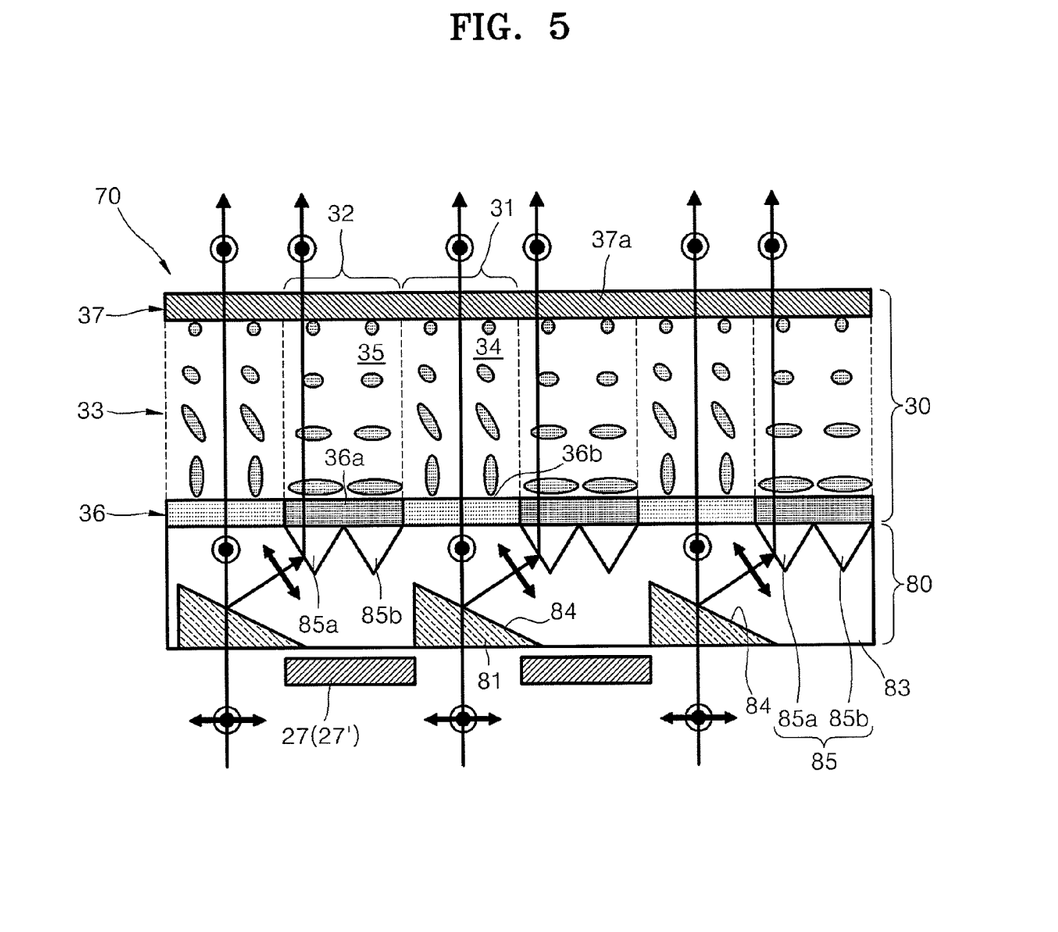
FIG. 5 is a schematic view of a polarization converting system according to still another exemplary embodiment of the present invention.

FIG. 5 illustrates a schematic view of a polarization converting system 70 according to another exemplary embodiment of the present invention. The polarization converting system 70 of this exemplary embodiment is identical to the polarization converting system 10 of the foregoing exemplary embodiment illustrated with reference to FIG. 2 except for a polarization splitting unit 80. Other parts including the polarization converting unit 30 are same as those of the foregoing exemplary embodiment illustrated with reference to FIG. 2. The same reference numbers will be used in FIG. 5 to refer to the parts that are same as those in FIG. 2 and the description thereof will be omitted in this exemplary embodiment.

Referring to FIG. 5, in the polarization converting system 70 of this exemplary embodiment, the polarization splitting unit 80 includes first splitting members 81, each of which is disposed to correspond to one of the first and second regions 31 and 32, for example, to a polarization maintaining region 34, and a second splitting member 83 having a first surface provided with a plurality of coupling grooves in which the first splitting members 81 are inserted and coupled and a second surface provided with a plurality of refracting portions 85, each of which corresponds to the other of the first and second regions 31 and 32, for example, to a polarization converting region 35 and functions as a light path changing portion. Alternatively, the first splitting members 81 may be disposed to correspond to the polarization converting regions 35 and the refracting portions 85 of the second splitting member 83 may be formed to correspond to the polarization maintaining regions 34.

The unpolarized light incident on the polarization converting system 70 of this exemplary embodiment can be directed only to the first splitting members 81 by the reflecting members 27 or the light shielding members 27'.

One of the first and second splitting members 81 and 83 is formed of an anisotropic medium and the other of the first and second splitting members 81 and 83 is formed of an isotropic medium. For example, the first splitting members 81 are formed of an anisotropic medium having an extraordinary refractive index (ne) and an ordinary refractive index (no). The second splitting member 83 is formed of an isotropic medium having a refractive index (ni) that is equal to the ordinary refractive index (no) or the extraordinary refractive index (ne).

The coupling grooves coupling the first splitting members 81 to the second splitting member 83 are formed such that a boundary surface 84 between each of the first splitting members 81 and the second splitting member 83 can define an inclined surface. At this point, the boundary surfaces 84 function as a polarization splitting portion splitting light according to the polarization. The unpolarized light incident on the first splitting members 81 straightly transmits the boundary surfaces 84 or is refracted to split according to the polarization at the boundary surfaces 84.

The refracting portions 85 are provided to allow the polarized light refracted on the boundary surfaces 84 to travel in a direction in parallel to light transmitted by the boundary surfaces 84 by refracting the polarized light.

Each of the refracting portions 85 includes one or more refracting grooves 85a and 85b adjacent to each other, which are formed on the second surface of the second splitting member 83 to correspond to the polarization converting region 35. Each of the refracting grooves 85a and 85b defines inclined surfaces that refract light, which travels after being refracted on the boundary surfaces 84, so that the light can travels in a direction in parallel with the light transmitting the boundary surfaces 84.

Each of the refracting grooves 85a and 85b may have a section formed in a triangular shape. FIG. 5 illustrates an example where each of the refracting portions 85 has two refracting grooves 85a and 85b. A whole area of the inclined surfaces defined by the refracting grooves 85a and 85b must be designed to cover a range of light traveling from the boundary surfaces 84 toward the refracting portions 85. That is, when the refracting portion 85 includes only one refracting groove, a depth of the refracting groove must be further increased. When the refracting portion 85 is designed to cover the range of the light using a plurality of the refracting grooves 85a and 85b, depths of the refracting grooves 85a and 85b may be reduced and thus a thickness of the polarization converting system may be reduced.

Figure 6:
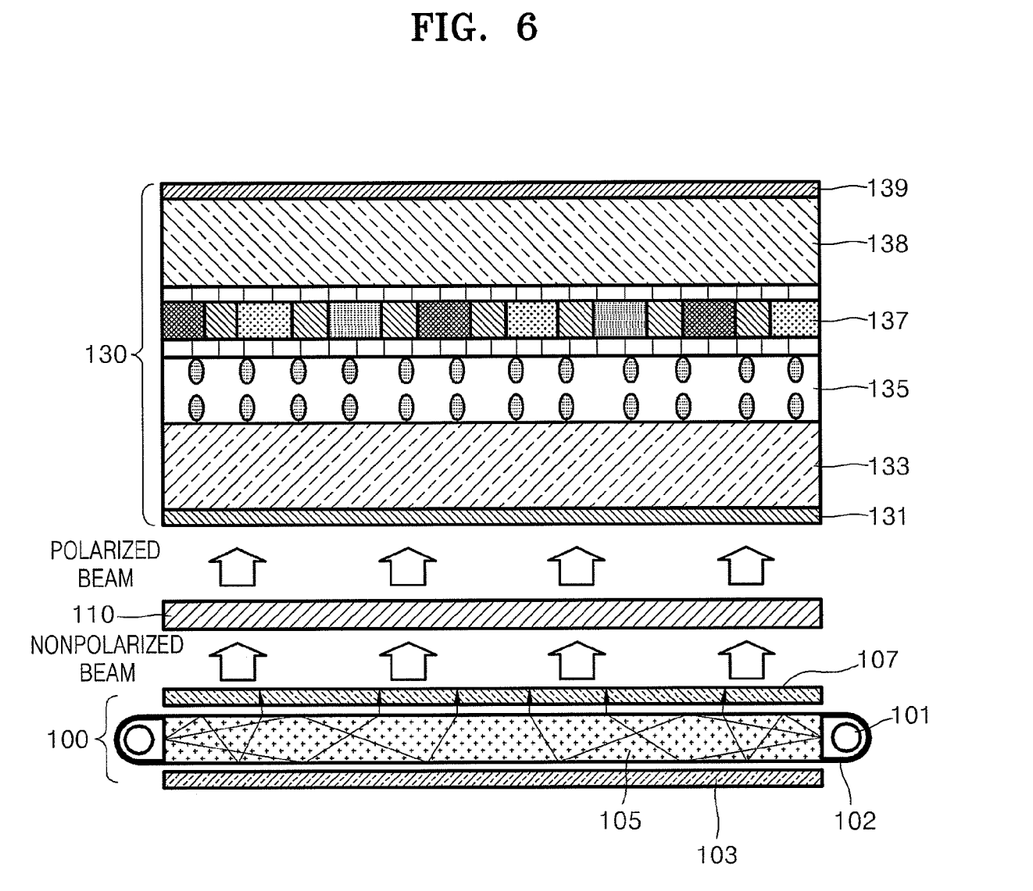
FIG. 6 is a schematic view of an LCD where a polarization converting system of the present invention is employed.

FIG. 6 illustrates a schematic view of an LCD where a polarization converting system of the present invention is employed.

Referring to FIG. 6, an LCD includes a liquid crystal panel 130, a backlight system 100 irradiating light to the liquid crystal panel 130, and a polarization converting system 110 converting light irradiated from the backlight system 100 to specific polarized light and allowing the polarized light to be incident on the liquid crystal panel 130. The polarization converting system 110 may be any one of the polarization converting systems that are described with reference to FIGS. 2 through 5.

The liquid crystal panel 130 includes first and second transparent substrates 133 and 138, a liquid crystal layer 135 disposed between the first and second transparent substrates 133 and 138, a color filter 137 provided on an inner surface of the second transparent substrate 138, a polarizer 131 provided on an outer surface of the first transparent substrate 133, and an analyzer 139 provided on an outer surface of the second transparent substrate 138.

A driving electrode (not shown) is formed on an inner surface of one of the first and second substrates 133 and 138 to control the liquid crystal layer 135 in a pixel unit and a common electrode (not shown) is formed on an inner surface of the other of the first and second substrates 133 and 138. The color filter 137 includes red (R), green (G) and blue (B) color elements in the pixel unit.

The backlight system 100 is provided to irradiate illumination light to the entire surface of the liquid crystal panel 130. The backlight system 100 includes a light guide plate 105, a lamp light source 101 disposed on both sides of the light guide plate 105, a reflecting mirror 102 enclosing the lamp light source 101, a reflecting plate 103 disposed below the light guide plate 105, and a collimator 107 disposed above the light guide plate 105. The light emitted from the lamp light source 101 is incident on the light guide plate 105 and guided by the light guide plate 105 to be irradiated upward. The collimator 107 collimates the light irradiated from the light guide plate 105.

The light irradiated from the backlight system 100 is converted into specific polarized light by the polarization converting system 110 and incident on the liquid crystal panel 130.

The polarization converting system 110 and the polarizer 131 of the liquid crystal panel 130 are arranged such that polarization direction of the light irradiated from the polarization converting system 110 is identical to a transmission axis of the polarizer 131.

The linearly polarized light transmitting the polarizer 131 is incident on the liquid crystal layer 135. When the polarization of the light passing through the liquid crystal layer 135 is changed by changing a direction of the liquid crystal director of the liquid crystal layer 135 using an electric field drive, the intensity of the light passing through the analyzer 139 varies, thereby displaying the image information and the like.

The more the light incident on the liquid crystal panel 130 is converted into single polarization, the higher the light efficiency. Since the polarization converting system 110 having outstanding efficiency in converting unpolarized light into specific polarized light is used, an LCD having an outstanding light efficiency property can be realized.

In FIG. 6, although an example where the polarization converting system according to the present invention is applied to the LCD is illustrated, the application of the polarization converting system is not limited to this example. Furthermore, although FIG. 6 illustrates an example of an LCD to which the polarization converting system according to the present invention is applied, the present invention is not limited to this example. For example, the liquid crystal panel 130 and the backlight system 100 may be modified in a variety of structures well-known in the field.

According to the exemplary embodiments of the present invention, the polarization splitting and polarization converting units of the polarization converting system can be automatically aligned with each other through a series of processes. Therefore, since the misalignment between the polarization splitting and polarization converting units can be prevented, the polarization converting efficiency as well as the light efficiency can be dramatically improved and the system can be manufactured through a simple manufacturing process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a polarization converting system, the method comprising:
providing a polarization splitting unit having at least one polarization splitting portion which splits unpolarized light into first and second polarized lights which have orthogonal polarizations and at least one light path changing portion which changes a transmission direction of the first polarized lights so that the first and second polarized lights are emitted in a same direction, wherein the first polarized lights are emitted through at least one region corresponding to the at least one light path changing portion and the second polarized lights are emitted through at least one region corresponding to the at least one polarization splitting portion;

forming a polarization converting unit including at least one first region and at least one second region that are different from each other in polarization converting extent, wherein the at least one first region is automatically aligned with the at least one light path changing portion of the polarization splitting portion and the at least one second region of the polarization converting unit is automatically aligned with the at least one polarization splitting portion of the polarization splitting unit, wherein the forming the polarization converting unit comprises:

disposing a first liquid crystal alignment layer, formed of photoreactive photopolymer over the polarization splitting unit; and irradiating first polarized ultraviolet light through the polarization splitting unit onto the first liquid crystal alignment layer, such that the first polarized ultraviolet light is incident on only at least one region of the first liquid crystal alignment layer corresponding to the at least one light path changing portion of the polarization splitting unit.

2. The method of claim 1, wherein one of the first and second regions is a polarization maintaining region which maintains a polarized state of the first polarized light and the other of the first and second regions is a polarization converting region which converts a polarized state of the second polarized light to the polarization state of the first polarized light.

3. The method of claim 2, wherein a portion of the liquid crystal layer, which corresponds to the polarization converting region, is formed in a twisted nematic mode and a portion of the liquid crystal layer, which corresponds to the polarization maintaining region, is formed in a hybrid aligned nematic mode.

4. The method of claim 3, wherein the two types of the alignment regions formed of the first liquid crystal alignment layer are homogeneous.

5. The method of claim 1, wherein the polarization splitting and light path changing portions of the polarization splitting unit are alternately arranged.

6. The method of claim 5, wherein the polarization splitting unit allows the light to be incident only on the polarization splitting portion.

7. The method of claim 1, wherein the forming the polarization converting unit further comprises:

forming a single liquid crystal alignment region by irradiating ultraviolet rays of second polarized ultraviolet light orthogonal to the first polarized ultraviolet light to a front surface of a second liquid crystal alignment layer formed of photoreactive photopolymer; and forming a liquid crystal layer by injecting one of liquid crystals and polymerizable liquid crystals with an initiator capable of forming the polymerizable liquid crystal into liquid crystal polymer between the first liquid crystal alignment layer and the second liquid crystal alignment layer, the liquid crystal layer having the first region and the second region.

8. The method of claim 7, wherein the first and second polarized ultraviolet lights are linearly polarized ultraviolet light having orthogonal polarization each other.

* * * * *